(12) United States Patent
Torii et al.

(10) Patent No.: US 6,450,056 B2
(45) Date of Patent: Sep. 17, 2002

(54) MOTOR HAVING SPEED REDUCTION DEVICE

(75) Inventors: Katsuhiko Torii, Hamamatsu; Hiroaki Yamamoto, Kosai, both of (JP)

(73) Assignee: Asmo Co., Ltd., Shizuoka (JP)

( * ) Notice: Subject to any disclaimer, the term of this patent is extended or adjusted under 35 U.S.C. 154(b) by 55 days.

(21) Appl. No.: 09/769,428

(22) Filed: Jan. 26, 2001

(30) Foreign Application Priority Data

Feb. 2, 2000 (JP) ........................................ 2000-024919
Feb. 2, 2000 (JP) ........................................ 2000-025191

(51) Int. Cl.[7] ............................. F16H 1/16; F16H 1/20
(52) U.S. Cl. ................................... 74/427; 74/412 TA
(58) Field of Search ................ 74/425, 427, 412 TA, 74/431; 310/90; 384/192

(56) References Cited

U.S. PATENT DOCUMENTS 4,369,387 A * 1/1983 Haar et al.
4,699,017 A * 10/1987 Periou
5,325,736 A * 7/1994 Tsujita
5,777,411 A * 7/1998 Nakajima et al.
6,076,628 A * 6/2000 Pattok et al.

* cited by examiner

*Primary Examiner*—David Fenstermacher
(74) *Attorney, Agent, or Firm*—Law Offices of David G. Posz

(57) ABSTRACT

In a motor having a motor body and a speed reduction devise composed of gear housing, a worm wheel, worm shaft with a worm, and first and second bearings rotatably supporting the worm shaft on opposite sides of the worm, the first bearing on a side of the motor body inclines a given angle to a bending side of the worm shaft, when the worm shaft is bent by an overload transmitted thereto via the worm wheel. Accordingly, a locally concentrated frictional wear of the bearing is reduced.

13 Claims, 15 Drawing Sheets

FIG. 12
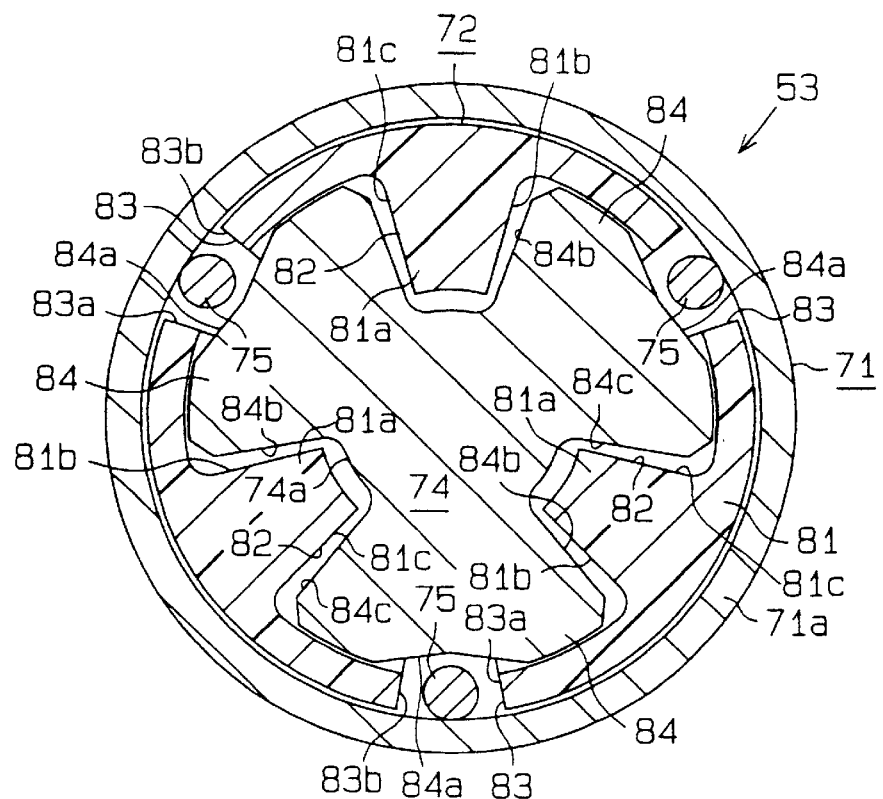
FIG. 13A  FIG. 13B
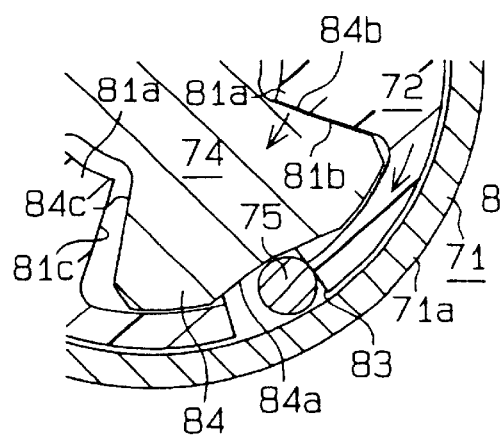 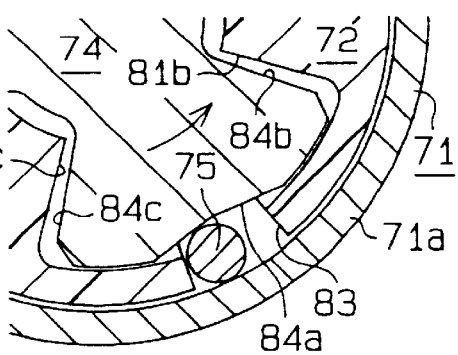

US 6,450,056 B2

MOTOR HAVING SPEED REDUCTION DEVICE

CROSS REFERENCE TO RELATED APPLICATION

This application is based upon and claims the benefit of priority of Japanese Patent Applications No. 2000-24919 filed on Feb. 2, 2000, No. 2000-25191 filed on Feb. 2, 2000, No. 2000-283360 filed on Sep. 19, 2000, and No. 2000-369722 filed on Dec. 5, 2000, the contents of which are incorporated herein by reference.

BACKGROUND OF THE INVENTION

1. Field of the Invention

The present invention relates to a motor, in particular, a motor having a worm and a worm wheel for speed reduction (speed reduction device), which is applicable to a power window or a sunroof.

2. Description of Related Art

Conventionally, a motor to be used in a power window system has a motor body and a speed reduction device. The speed reduction device has a gear housing in which a worm shaft coupled coaxially with a motor shaft of the motor body and a worm wheel in mesh with a worm formed in the worm shaft are housed. Opposite ends of the worm shaft are rotatably held by bearings fixed in the gear housing.

When the motor shaft is driven to rotate, the worm shaft rotates along with the rotation of the motor shaft so that worm wheel rotates at a lower speed and with a higher torque than the worm shaft. Accordingly, an output shaft connected to the worm wheel rotates to transmit its rotational force to an outside load. Such a motor is applicable not only to the power window system but also the other various systems in which the output shaft rotates at a low speed and with a high torque.

However, when an overload is applied to the output shaft during the rotation of the motor, the worm shaft receives a large bending force in a perpendicular direction thereto (in an opposite direction to a position where the worm wheel is located). Therefore, the bending force together with a rotating force transmitted from the motor shaft causes the worm shaft to bend. Accordingly, the conventional motor has a drawback that locally concentrated frictional wear is likely to occur in the bearings rotatably holding the worm shaft or the gear housing made of resin is likely to deform, resulting in reducing a motor efficiency and generating noises.

SUMMARY OF THE INVENTION

An object of the invention is to provide a motor in which local frictional wear of bearings rotatably holding the worm shaft and deformation of a gear housing are limited.

To achieve the above objects, a motor has a speed reduction devise composed of gear housing, a worm wheel, a worm shaft with a worm, and first and second bearings rotatably supporting the worm shaft on opposite sides of the worm. With the motor mentioned above, when the worm shaft is bent by an overload transmitted thereto via the worm wheel, an axial inner surface of the first bearing maintains an axially widespreading face contact with the worm shaft in a manner that the first bearing inclines a given angle toward a bending side of the worm shaft to follow the bending of the worm shaft or in a manner that the axial inner surface of the first bearing is formed in a shape of approximately following a bending shape of the worm shaft and actually contacts the worm shaft at positions more extending axially toward the worm.

It is preferable that the gear housing has a bearing holding portion protruding outwardly therefrom to an extent that the bearing holding portion readily inclines along with the first bearing fixed thereto in order to follow the bending of the worm shaft.

Further, preferably, the first bearing is provided with a first cylindrical inner circumferential portion whose inner diameter is axially constant and a first tapered inner circumferential portion axially adjacent to the first cylindrical inner circumferential portion on a side of the worm, an inner diameter of the first tapered inner circumferential portion is larger toward an opposite side to the first cylindrical inner circumferential portion. In the motor having the first bearing mentioned above, the axial inner surface of the first bearing actually in contact with the worm shaft is normally the first cylindrical inner circumferential portion and, when the worm shaft is bent by a given amount, extends up to at least a part of the first tapered inner circumferential portion.

It is preferable that the second bearing has also a second cylindrical inner circumferential portion and a second tapered inner circumferential portion whose constructions are same as those of the first bearing. The First and second tapered inner circumferential portion are arranged to face each other on opposite sides of the worm. Therefore, the respective axial inner surfaces of the first and second bearings are formed in a shape of approximately following the bending shape of the worm shaft and actually contact the worm shaft at positions more extending axially toward the worm, when the worm shaft is bent.

BRIEF DESCRIPTION OF THE DRAWING

Other features and advantages of the present invention will be appreciated, as well as methods of operation and the function of the related parts, from a study of the following detailed description, the appended claims, and the drawings, all of which form a part of this application. In the drawings:

FIG. 12 is a cross sectional partial view of the clutch of FIG. 11;

FIG. 13A is another cross sectional partial view the clutch of FIG. 11;

FIG. 13B is a further cross sectional partial view of the clutch of FIG. 11;

DETAILED DESCRIPTION OF THE PREFERRED EMBODIMENTS (First Embodiment)

A motor applicable to a power window system is described with reference to FIGS. 1 to 7. A motor 1 is composed of a partly flat-cylindrical motor body 2, a speed deduction device 3 and a clutch C (refer to FIG. 2)

Figure 1:
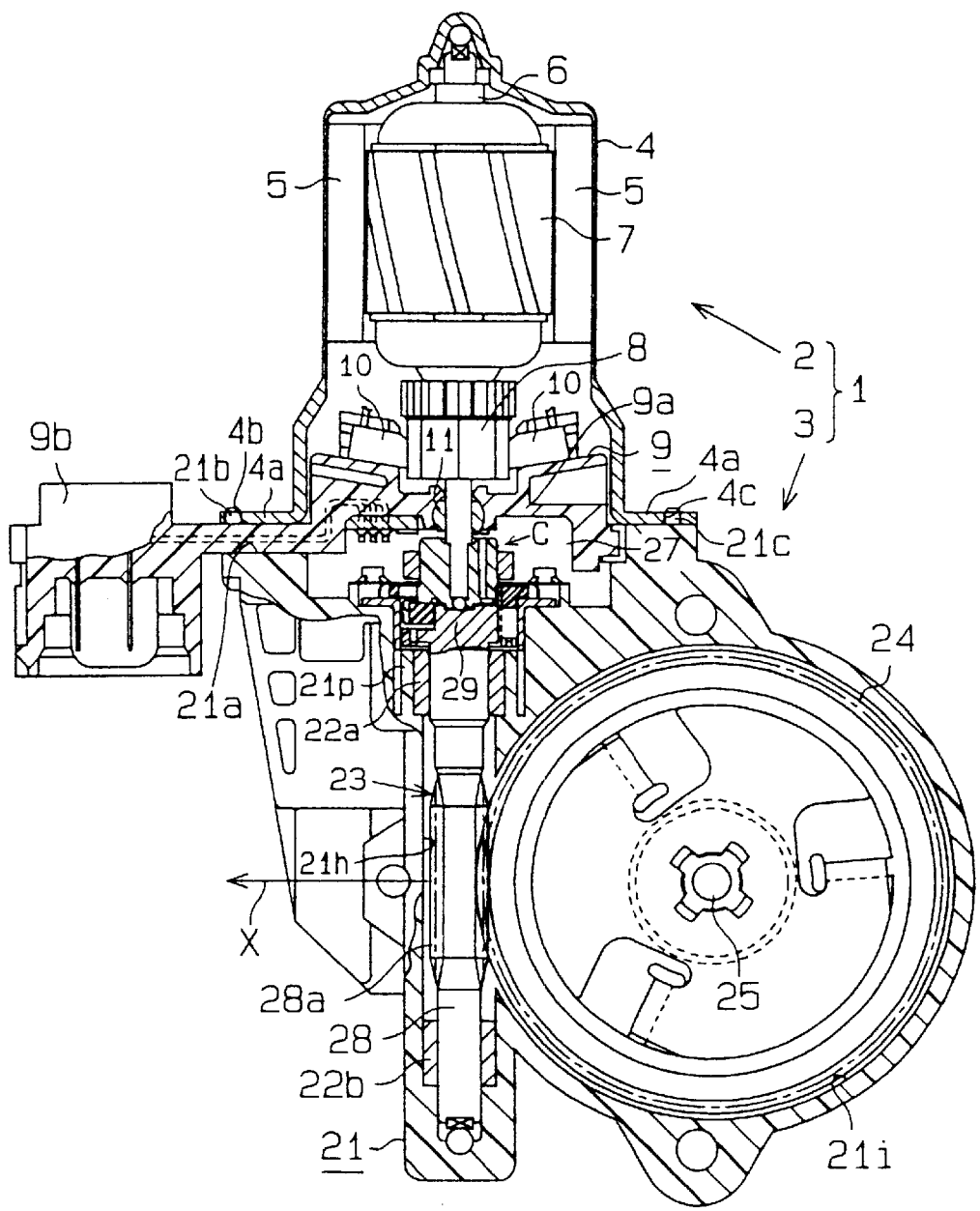
FIG. 1 is a cross sectional view showing a motor according to a first embodiment of the present invention.

As shown in FIG. 1, the motor body 2 is composed of a yoke housing 4 (hereinafter called a yoke), a pair of magnets 5, a motor shaft 6, an armature 7, a commutator 8, resin brush holders 9 and a pair of brushes 10 for power supply.

Figure 2:
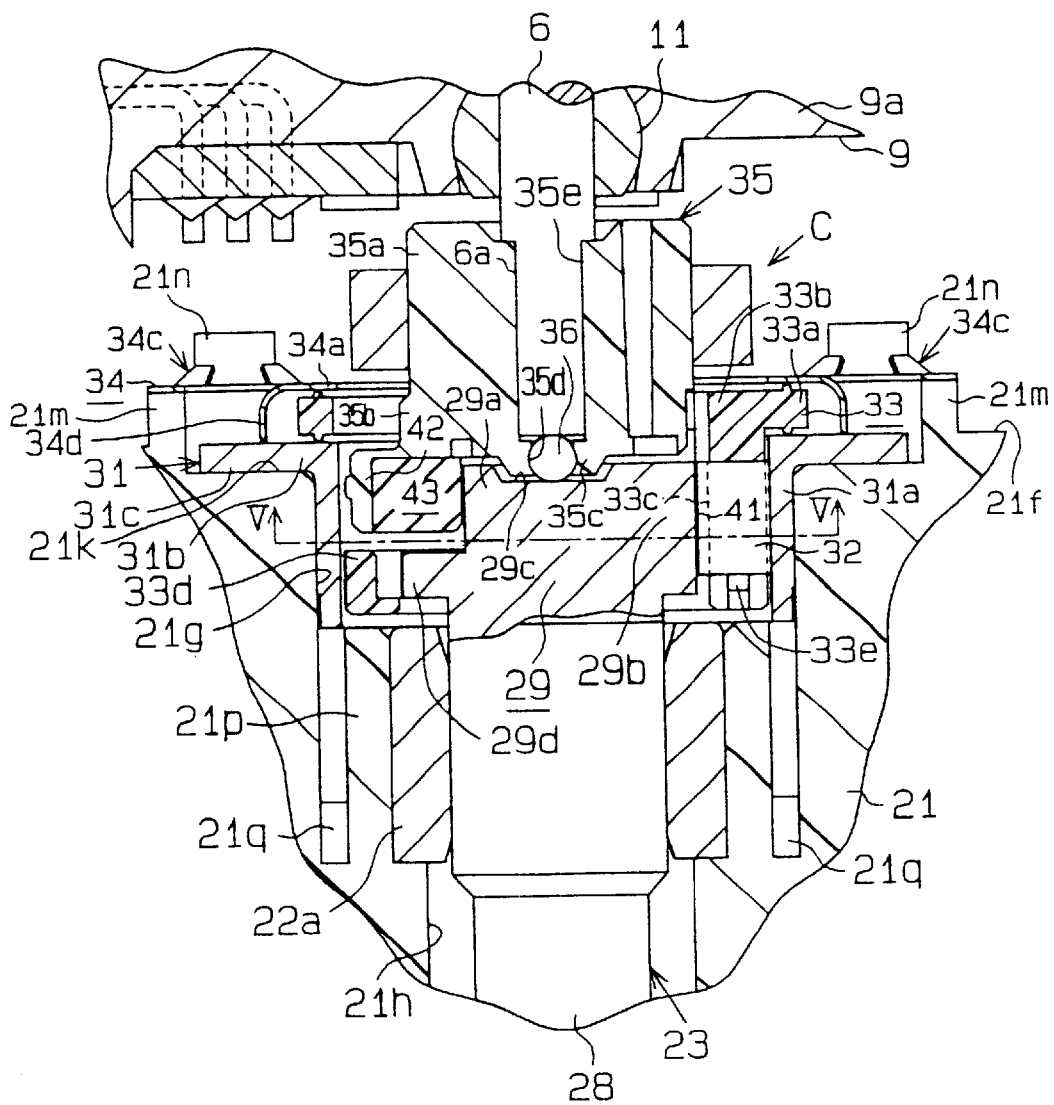
FIG. 2 is a partly enlarged cross sectional view of the motor of FIG. 1.

The yoke 4 is formed in such shape as a partly flat cylinder having a bottom. The respective magnets 5 are fixed to face each other to longitudinally opposite inner surfaces of the yoke 4 in a cross section perpendicular to an axis thereof. The bottom of the yoke 4 holds a base end of the motor shaft 6 rotating in an axis of the yoke 6. As shown in FIG. 2, a front end of the motor shaft 6 is provided with a coupling projection 6a having two flat surfaces in parallel to each other.

The armature 7 is fixed to a middle part of the motor shaft 6 at a position corresponding to the positions of the magnets 5. The commutator 8 is fixed to the motor shaft on an front end side thereof with respect to the armature.

An opening end of the yoke 4 is provided with flanges 4a each extending longitudinally and outwardly in a cross section perpendicular to the axis thereof. Holes 4b and 4c for positioning are formed in the respective flanges 4a.

The brush holder 9 is fitted and fixed to the opening end of the yoke 4. The brush holder 9 has a holder body 9a whose shape corresponds to that of the opening end of the yoke 4 so as to cover substantially the opening end thereof and a connector 9b protruding outwardly in a radial direction of the motor shaft 6 from one of the flanges 4a (on a left side in FIG. 1). The brushes 10, which are connected in circuit with the connector 9b by wires (not shown), are arranged on the holder body 9a on an inner side of the yoke 4. The holder body 9a is provided in a near center thereof with a bearing 11, which rotatably holds the motor shaft 6 on a front end side thereof.

The brushes 10 are arranged at positions corresponding to that of the commutator 8 and contact the commutator 8. Current is supplied to coil wires wound on the armature 7 via the connector 9b, the brushes 10 and the commutator 8 from a control device (outside power source), which is not shown, so that the armature, that is, the motor shaft 6 of the motor body 2 is driven to rotate.

The speed reduction device 3 is composed of a resin gear housing 21, first and second bearings 22a and 22b, a worm member 23, a worm wheel 24 and an output shaft 25.

Figure 3:
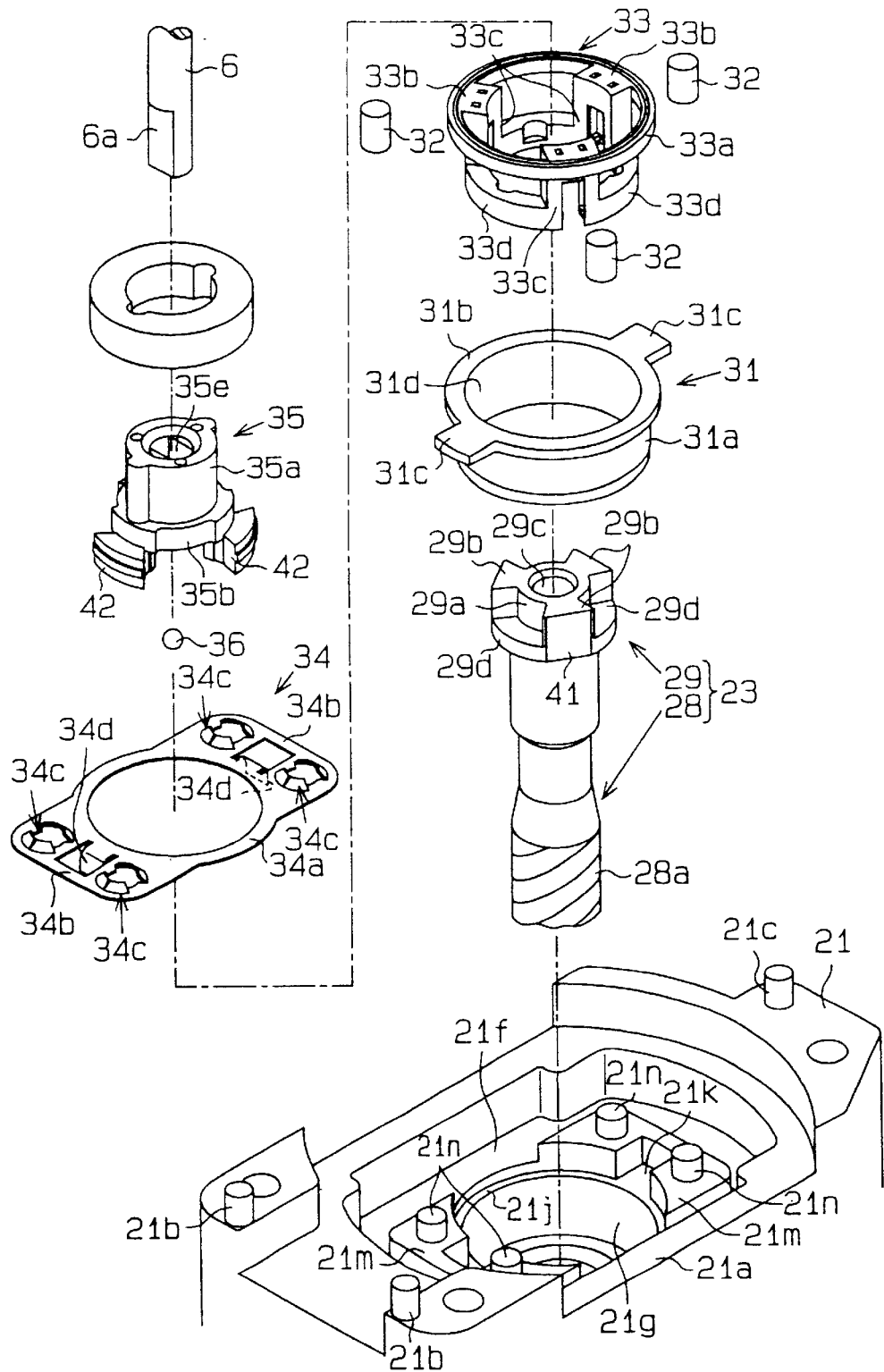
FIG. 3 is exploded perspective views of a clutch according to the first embodiment.
Figure 4:
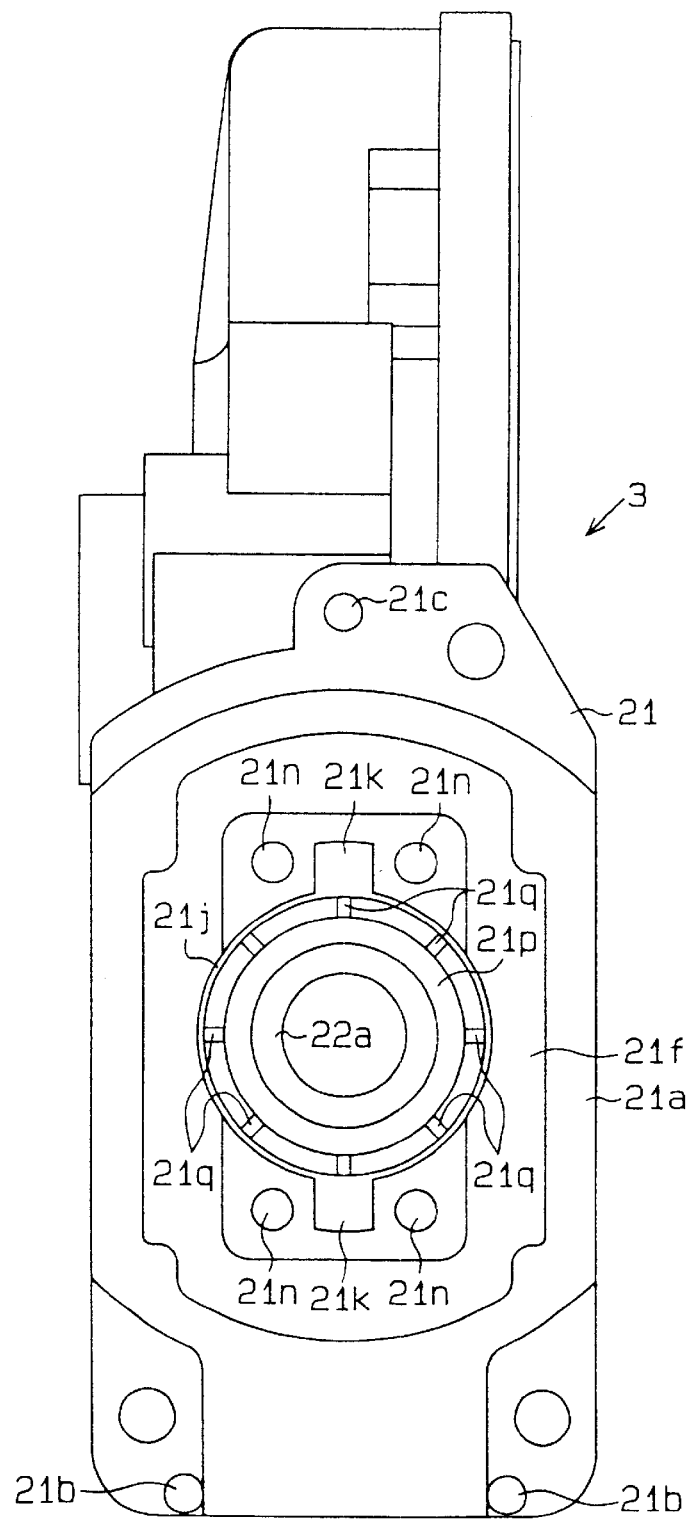
FIG. 4 is a plan view of a gear housing according to the first embodiment.

An end of the gear housing 21 (on an upper side in FIG. 1 and hereinafter called an upper end thereof) is formed in a partly flat-cylinder shape (nearly rectangular shape) corresponding to that of the opening end of the yoke 4 and fixed to the motor body 2. As shown in FIG. 3, the gear housing 21 is provided at the upper end thereof with a recess 21a into which the holder body 9a of the brush holder 9 is fitted. The upper end of the gear housing 21 is further provided at positions corresponding to those of the holes 4b and 4c for positioning with projections 21b and 21c that are fitted into the holes 4b and 4c, respectively. The gear housing 21 is fastened to the yoke by screws (not shown) in a state that the projections 21b and 21c are inserted into the holes 4b and 4c and the holder body 9a is fitted into the recess 21a.

The gear housing 21 is provided with a long recess 21f extending longitudinally in opposite directions from a bottom center of the recess 21a. Further, the gear housing 21 is provided with a circular shaped clutch housing recess 21g extending radially from a bottom center of the long recess 21f, and with a worm shaft housing recess 21h (refer to FIG. 2) extending in an axial direction of the motor shaft 6 from a bottom center of the clutch housing recess 21g. Furthermore, the gear housing 21 is provided a wheel housing recess 21i that communicates with a middle portion of the worm shaft housing recess 21h in a perpendicular direction to an axis thereof (on a right side in FIG. 1).

A ring shaped flange fitting recess 21j is formed at an opening portion of the clutch housing recess 21g. Engaging recesses 21k, which extend in a longitudinal direction of the clutch housing recess 21g, are formed continuously at longitudinally opposite ends of the clutch housing recess 21g.

Two basement seats 21m are formed on a bottom of the long recess 21f. Each of the basement seats 21m is arranged around each of the engaging recesses 21. That is, the basement seat 21m has a wall continuous to a wall of the engaging recess 21k and is formed near in a letter lateral U shape. Column shaped engaging projections 21n are formed on each upper surface of the basement seats 21m on transversely opposite ends thereof.

As shown in FIG. 2, a cylindrical bearing holding portion 21p, which may relatively easily bend in a perpendicular direction of an axis thereof, is formed so as to protrude axially from a bottom of the clutch housing recess 21g nearly until an axial middle portion thereof. An inner diameter of the bearing holding portion 21p is larger than a diameter of the worm shaft housing recess 21h and an outer diameter thereof is smaller than an inner diameter of the clutch housing recess 21g. The bearing holding portion 21p is provided on an outer circumferential surface on a base side thereof with 8 pieces of ribs 21q, which are arranged with at 45° constant angular intervals and connected with an inner surface of the clutch housing recess 21g. Each size of the ribs 2lq is so decided that a bending amount of the bearing holding portion 21p in a perpendicular direction to an axis thereof shows a predetermined value relative to a given value of bending load applied thereto.

The first and second bearings 22a and 22b, which are cylindrical metal bearings, are fitted into the bearing holding portion 21p and into a bottom sidewall of the worm shaft housing recess 21h (lower side of FIG. 1), respectively. An inner diameter of the first bearing 22a is smaller than that of the warm shaft housing recess 21h.

The worm member 23, which is made of metal, is composed of a worm shaft 28 and a driven rotor 29 formed integrally with the worm shaft on a side of the motor body 2 (refer to FIG. 3). The worm shaft 28 is provided on a middle part thereof with a worm 28a and is housed in the worm housing recess 21h. Opposite ends of the worm shaft 28 are rotatably held by the first and second bearings 22a and 22b.

The worm wheel 24 is in mesh with the worm 28a and housed in the wheel housing recess 21I so as to rotate in an axial center thereof perpendicular to the worm shaft 28 (in a perpendicular direction to the drawing of FIG. 1). The output shaft 25 is connected to the worm wheel 24 so as to rotate coaxially with the worm wheel 24. The output shaft 25 is linked via a regulator (not shown) with a wind glass (not shown).

The motor shaft 6 is coupled via the clutch C with the worm shaft 28. The clutch C, as shown in FIGS. 2 and 3, has the driven rotor 29, a collar 31, a plurality of (3) rollers 32, a support element 33, a stopper 34, a drive rotor 35 and a ball 36. The collar 31 is composed of a cylindrical outer ring 31a, a flange 31b extending radially and outwardly from an end (upper end in FIG. 2) of the outer ring 31a and a pair of engagement portions 31c extending radially and outwardly further from the flange portion 31b at 180° angular intervals.

The outer ring 31a of the collar 31 is fitted into the clutch housing recess 21g and the flange portion 31b thereof is fitted into the flange fitting recess 21j. The collar 31 is prevented from rotating since the engagement portions are fitted to the engaging recesses 21k. Another end (lower end in FIG. 2) of the outer ring 31a is fitted to reach a position near a front end (upper end in FIG. 2) of the bearing holding portion 21p and not to interfere the bending of the bearing holding portion 21p. The driven rotor 29 is arranged inside the outer ring 31a.

As shown in FIG. 3, the driven rotor 29 has a shaft portion 29a extending coaxially from a base portion of the worm shaft 28 toward the motor body 2 (toward the motor shaft 6) and 3 pieces of engaging projections 29b extending radially and outwardly from the shaft portion 29a at 120° constant angular intervals. Each circumferential width of the engaging projections 29b becomes wider in a radially outward direction. A radial outer surface of the engaging projection 29b constitutes a control surface 41. A radial distance between an inner circumferential surface 31d of the outer ring 31a and the control surface 41 varies in a rotating direction. The control surface 41 is a flat surface, the radial distance from which to the inner circumferential surface 31d is shorter toward an end of the driven rotor 29 in a rotating direction. As shown in FIGS. 2 and 3, a round hole 29c is provided in an axial center of the shaft portion 29a on a side of the motor body 2 (motor shaft 6). The driven rotor 29, as shown in FIG. 3, is provided with ribs 29d for reinforcing the engaging projections 29b. The ribs 29d are formed to link circumferential side surfaces of the engaging projections 29b at leading ends thereof on a side of the worm shaft 28 and adjacent circumferentially to each other.

The rollers 32, which are metal and formed in a near column shape, are arranged between the control surface 41 and the inner circumferential surface 31d. Each diameter the rollers 32 is smaller than a distance between a center 41a of the control surface 41 (middle part in a rotating direction) and the inner circumferential surface 31d of the outer ring 31a and is larger than a distance between an end 41b or 41c of the control surface 41 (end part in a rotating direction) and the inner circumferential surface 31d of the outer ring 31a. That is, the distance of the roller 32 is equal to a distance between a middle 41d of a portion, which bridges the center 41a and the end 41b or 41c of the control surface 41, and the inner circumferential surface 31d of the outer ring 31a.

A resin supporting element 33 holds rotatably the rollers 32 arranged substantially in parallel to each other at constant intervals. As shown in FIGS. 2 and 3, the supporting elements 33 is composed of a ring portion 33a, 3 inner extending portions 33b, 3 pairs of roller supports 33c and 3 connecting portions 33d. Diameter of the ring portion 33a is larger than that of the outer ring 31a. The 3 inner extending portions 33b are provided in a radially inside circumference of the ring portion 33a at constant angular intervals. Each pair of the roller supports 33c extends axially from circumferentially inside and opposite ends of each of the inner extending portions 33b. Each of the connecting portions 33d is formed in an arc shape to connect the roller supports 33c adjacent to each other. Further, the each pair of the roller supports 33c is provided at leading ends thereof with retainers 33e facing each other in a circumferential direction. Each of the rollers 32 is held not to move in axial and circumferential directions of the ring portion 33a by the each pair of the roller supports 33c, each of the inner extending portions 33b and each pair of retainers 33e. The supporting element 33, which holds the rollers 32, is assembled to the collar 31 in such a manner that each of the roller supports 33c is inserted into an inside of the outer ring 31a, while the rollers 32 are held between the control surface 41 and the inner circumferential surface 31d, and the ring portion 33a puts on and comes in contact with the flange 31b.

A stopper 34 is made of a metal sheet having even thickness. The stopper 34 has a ring shaped contacting portion 34a whose diameter is almost equal to that of the ring portion 33a of the support element 33 and extending portions extending radially and outwardly from the contacting portion 34a at 180° angular intervals. As shown in FIG. 2, outer and inner diameters of the contacting portion 34a are equal to those of the outer ring 31a. Each of the extending portions 34b is provided with fixing portions 34c to correspond to the engaging projections 21n of the gear housing 21 so that the fixing portions are arranged at four corners of the stopper 34. The stopper 34 is fixed to the gear housing by fitting the engaging projections 21n into the fixing portions 34c. The contacting portion 34a of the stopper 34 is arranged on an upper surface (upper side in FIG. 1) of the ring portion 33a. As the ring portion 33a of the support element 33 contacts the contacting portion 34a, the stopper 34, together with the support element 33, serves to restrict each axial movement of the rollers 32.

As shown in FIGS. 2 and 3, each of the extending portions 34b is provided at a near center thereof with a restricting portion 34d, which is formed by cutting and bending a part of the extending portion 34b. Each end of the restricting portions contacts each engagement portions 31c of the collar 31 so that an axial movement of the collar is restricted.

The drive rotor 35, which is made of resin, has a shaft portion 35a, a disk portion 35b whose diameter is larger than that of the shaft portion 35a, and an extending portion 35c extending axially from an axial center of the disk portion 35b. The drive rotor 35 is provided with a ball housing recess 35d extending from an end of the extending portion 35c until a middle of the disk portion 35b. A wall of the ball housing recess 35d perpendicular to an axis thereof is formed in a spherical shape. A ball 36 is held in the ball housing recess 35d in a state that a part of the ball 36 exposes out of the end of the extending portion 35c.

The drive rotor 35 is provided at an axial center thereof with a coupling bore 35e having two flat surfaces in parallel to each other, which extends axially from a base end (upper end in FIG. 2) of the shaft portion 35a to communicate to the ball housing recess 35d. The drive rotor 35 is linked with the motor shaft 6 without rotating relative to the motor shaft 6 in such a manner that the coupling projection 6a of the motor shaft 6 is coupled with the coupling bore 35e. The extending portion 35c is almost housed in the round hole 29c of the driven rotor 29 and the ball 36, which partly exposes out of the end of the extending portion 35c, is in contact with a bottom of the round hole 29c.

Figure 5:
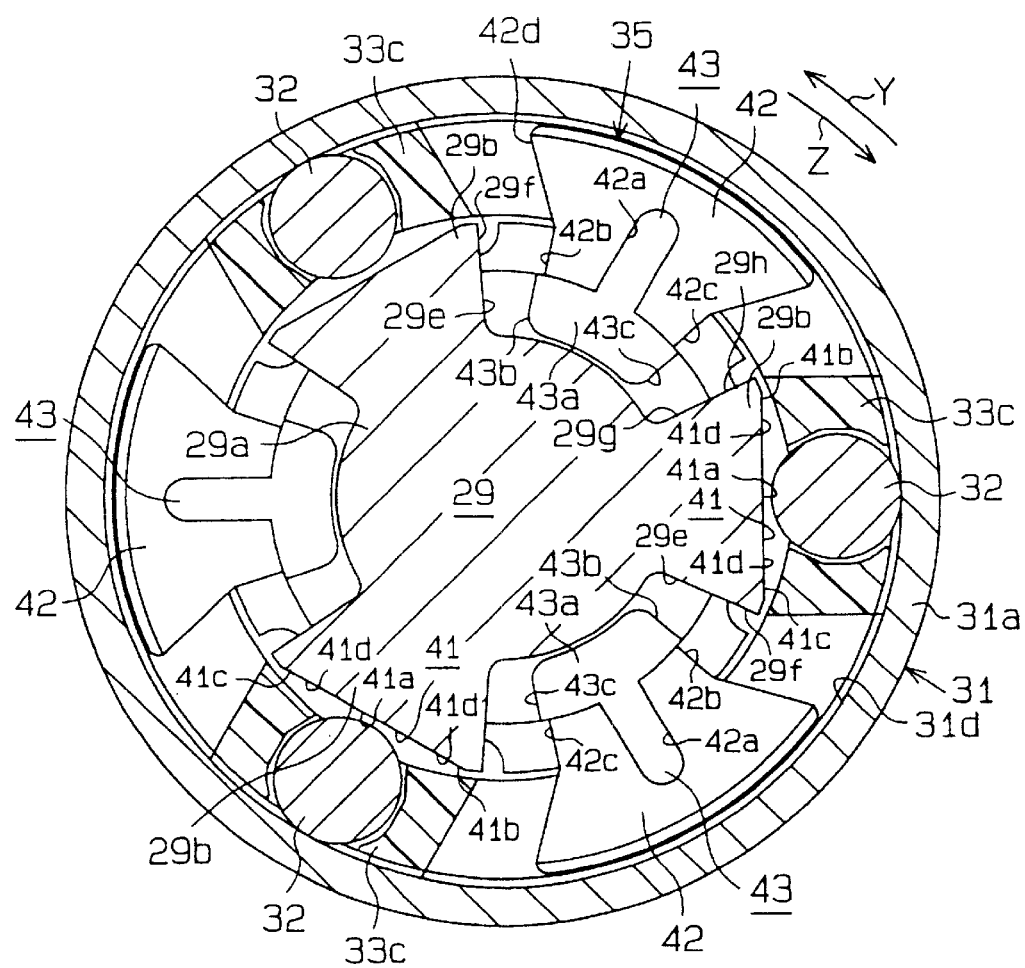
FIG. 5 is a cross sectional view taken along a line V—V of FIG. 2.

As shown in FIG. 3, the drive rotor 35 is provided on an end side (lower side in FIG. 2) of the disk portion 35b with a plurality (3 pieces) of fan shaped projections 42 which extend radially and outwardly and protrude axially from the end of the disk portion 35b at constant angular intervals (at predetermined angular positions). As shown in FIG. 5, each of the projections 42 has a large arc shaped surface, whose diameter is slightly smaller that that of the inner circumferential surface 31d of the outer ring 31a and is formed along the inner circumferential surface 31d. That is, the projections 42 of the drive rotor 35 are able to axially pass through a center bore of the contacting portion 34a of the stopper 34. Each of the projections 42 has a fitting groove 42a (refer to FIG. 5) extending radially from a radial inside thereof to a middle part thereof. The projections 42 are placed between the respective engaging projections 29b of the driven rotor 29 and between the respective rollers (respective roller supports 33c) in the outer ring 31a.

Rubber buffers 43 are fitted into and fixed to the respective fitting grooves 42a. Each of the buffer 43 has a shock absorb portion 43a protruding radially and inwardly from the fitting groove 42a and extending in a circumferential direction thereof. A circumferential width of the shock absorb portion 43a, as shown in FIG. 5, is slightly larger than that of an inner circumferential surface of the projection 42.

When the drive rotor 35 rotates counterclockwise (an arrow Y direction in FIG. 5) to a certain position relative to the driven rotor 29, a one side surface 43b of the shock absorb portion 43a (on a counterclockwise side) comes in contact with a first buffer surface 29e of the engaging projection 29b on a clockwise and radially inner side thereof. When the drive rotor 35 rotates counterclockwise further from the certain position, a side surface 42b of the projection 42 on a counterclockwise and radially inner side thereof comes in contact with a first contacting surface 29f of the engaging projection 29b on a clockwise and radially outer side thereof. Since the shock absorb portion 43a is deformed in a circumferential direction thereof, the drive rotor 35 may rotate counterclockwise further from the certain position (refer to FIG. 6).

On the other hand, when the drive rotor 35 rotates clockwise (an arrow Z direction in FIG. 5) to a certain position relative to the driven rotor 29, another side surface 43c of the shock absorb portion 43a (on a clockwise side) comes in contact with a second buffer surface 29g of the engaging projection 29b on a counterclockwise and radially inner side thereof. When the drive rotor 35 rotates clockwise further from the certain position, another side surface 42c of the projection 42 on a clockwise and radially inner side thereof comes in contact with a second contacting surface 29h of the engaging projection 29b on a counterclockwise and radially outer side thereof. Since the shock absorb portion 43a is deformed in a circumferential direction thereof, the drive rotor 35 may rotate clockwise further from the certain position.

Figure 6:
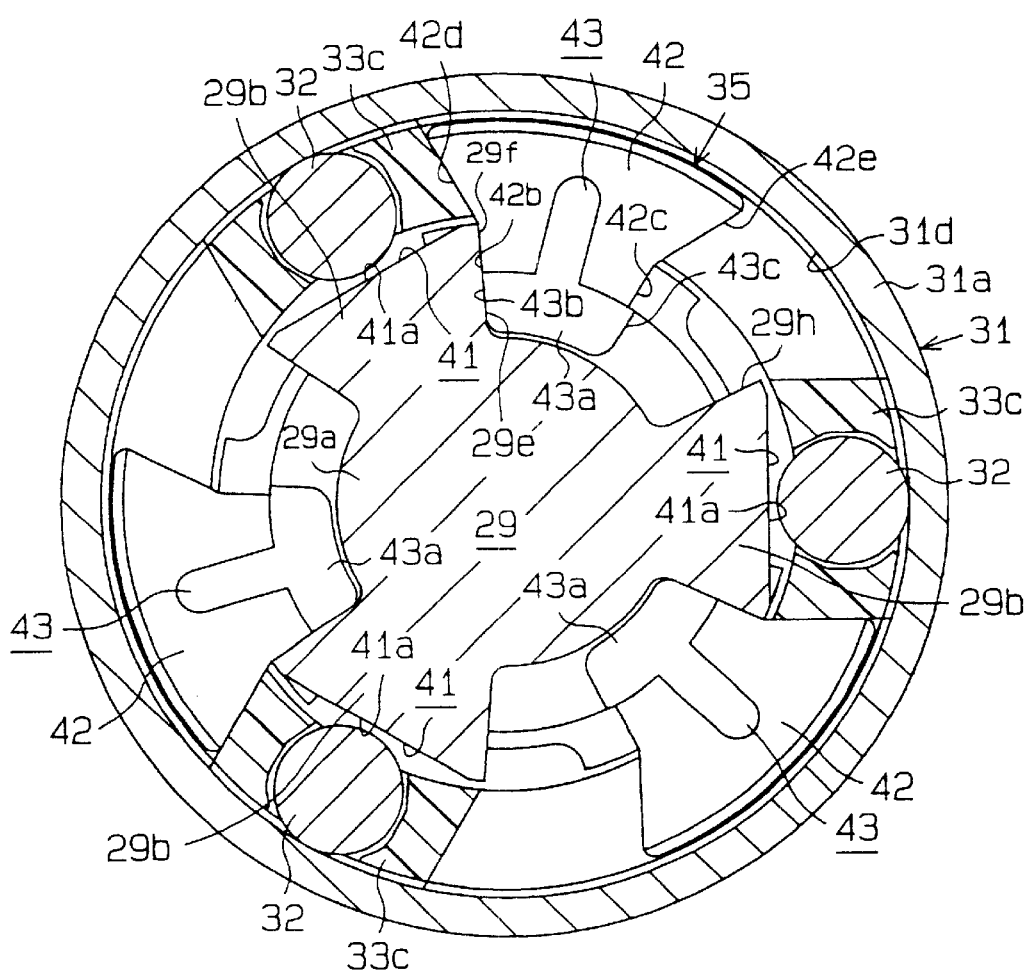
FIG. 6 is another cross sectional view taken along a line V—V of FIG. 2.

As shown in FIG. 6, the roller 32 is located at a position corresponding to the center 41a of the control surface 41 in a state that the side surface 42b of the projection 42 contacts the first contacting surface 29f of the engaging projection 29b and a first pressing surface 42d of the projection 29b on a counterclockwise and radially outer side thereof contacts the roller support 33c.

Further, the roller 32 is located at a position corresponding to the center 41a of the control surface 41 in a state that the another side surface 42c of the projection 42 contacts the second contacting surface 29h of the engaging projection 29b and a second pressing surface 42e of the projection 29b on a clockwise and radially outer side thereof contacts the roller support 33c.

An operation of the motor 1 for the power window system mentioned above is described below.

When the motor body 2 is driven to rotate the motor shaft 6 in a counterclockwise direction (the arrow Y direction in FIG. 5), the drive rotor 35 (projections 42) rotates together with and in a same direction to the motor shaft 6. Then, as shown in FIG. 6, when the side surface 42b of the projection 42 contacts the first contacting surface 29f of the engaging projection 29b and the first pressing surface 42d of the projection 29b contacts the roller support 33c, the roller 32 is at a position (neutral position) corresponding to the center 41a of the control surface 41.

As the one side surface 43b of the shock absorb portion 43a contacts the first buffer surface 29e of the engaging projection 29b in advance before the side surface 42b of the projection 42 contacts the first contacting surface 29f, a shock on contacting is small.

At the neutral position, the driven rotor 29 is rotatable relative to the collar 31 since the rollers 32 are not held between the control surfaces 41 of the engaging projections 29b and the inner circumferential surface 31d of the outer ring 31a. Accordingly, as the drive rotor 35 further rotates counterclockwise, a rotating force of the drive rotor 35 is transmitted from the projections 42 to the driven rotor 29 so that the driven rotor 29 rotates together with the drive rotor 35. At this time, the rollers receive a rotating force in the same direction (the arrow Y direction) from the first pressing surface 42d and move in the same direction.

To the contrary, when the motor shaft 6 rotates in a clockwise direction (The arrow Z direction in FIG. 5), the rollers 32 are at the neutral position similarly as mentioned above. In this state, the driven rotor 29 is rotatable relative to the collar 31 since the rollers 32 are not held between the control surfaces 41 of the engaging projections 29b and the inner circumferential surface 31d of the outer ring 31a. Accordingly, a rotating force of the drive rotor 35 is transmitted from the projections 42 to the driven rotor 29 so that the driven rotor 29 rotates together with the drive rotor 35.

Then, the worm shaft 28 rotates together with the driven rotor 29 so that the worm wheel and the output shaft 25 rotates for closing or opening the window glass linked with the output shaft 25.

Figure 7:
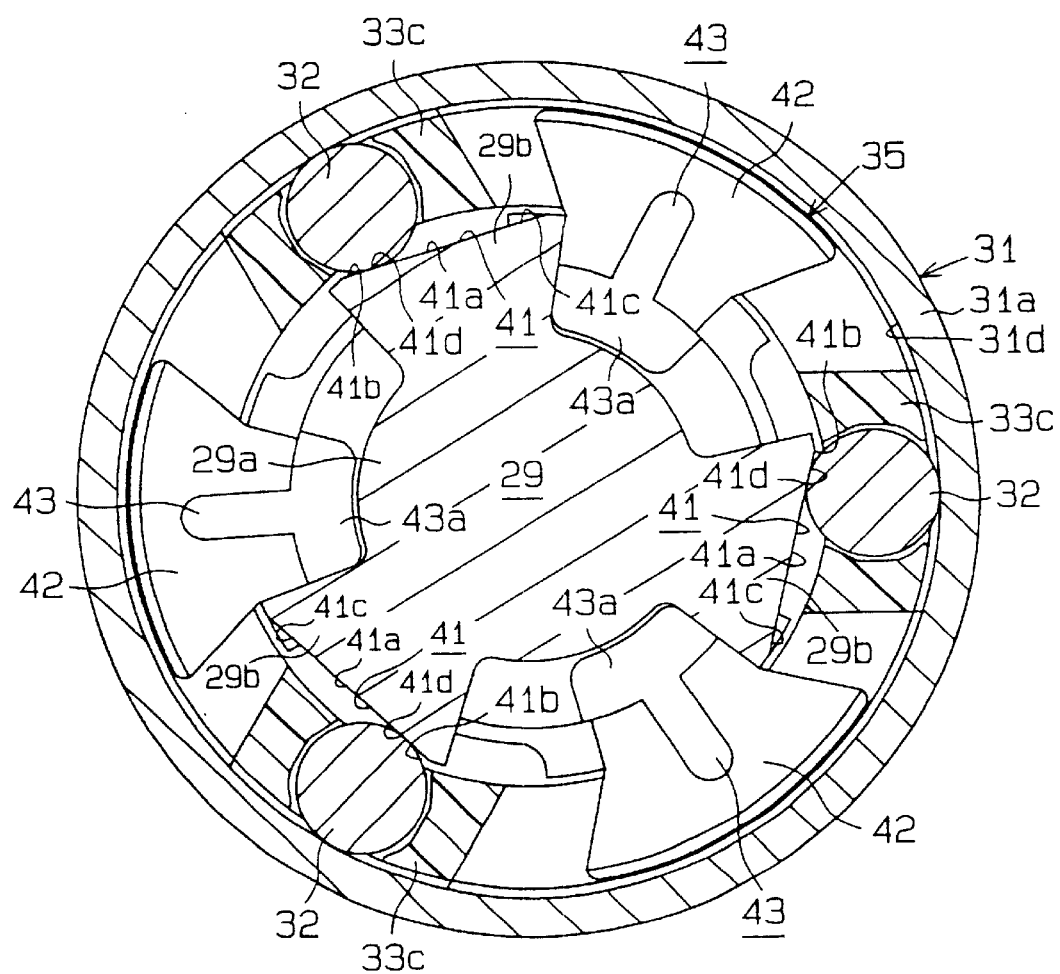
FIG. 7 is a further cross sectional view taken along a line V—V of FIG. 2.

On the other hand, when a load is applied to the output shaft 25 in a state that the motor 1 stops, the load causes the driven rotor 29 to rotate clockwise (the arrow Z direction in FIG. 5). As a result, each of the rollers 32 is moved relative to the driven rotor 29 toward the end 41b (the middle 41d) of the control surface 41 of the engaging projection 29b. As shown in FIG. 7, when the roller 32 makes a relative movement up to the middle 41d, the roller 32 is held (rocked) between the control surface 41 and the inner circumferential surface 31d of the outer ring 31a. As the outer ring 31a is fixed, further rotation of the driven rotor 29 is prevented without a follow rotation of the drive rotor 35.

To the contrary, when the driven rotor 29 is rotated in a counterclockwise (the arrow Y direction in FIG. 5), each of the rollers 32 is moved relative to the driven rotor 29 toward the end 41c (the middle 41d) of the control surface 41 of the engaging projection 29b, since the drive rotor stops. Then, when the roller 32 makes a relative movement up to the middle 41d, the roller 32 is held (rocked) between the control surface 41 and the inner circumferential surface 31d of the outer ring 31a. As the outer ring 31a is fixed, further rotation of the driven rotor 29 is prevented without a follow rotation of the drive rotor 35.

As mentioned above, even if large load is applied to the output shaft 25, the rotation of the driven rotor 29 is prevented. Accordingly, the window glass linked with the output shaft 25 is never opened or closed by its gravity or the load from outside.

Further, as the clutch C has a slight clearance between an outer surface of the drive rotor 35 (the large arc surfaces of the projections) and the inner circumferential surface 31d of the outer ring 31a, alignment gaps (radial displacement and inclination) as to axes of the drive rotor 35, the collar 31 and the driven rotor 29 are allowed, if they fall within a given range. That is, the clutch C serves to allow a given amount of alignment gap (radial displacement and inclination) between the motor shaft 6 and the worm shaft 28.

When an overload is applied to the output shaft 25 during a driving operation of the motor 1, a middle part of the worm shaft 28 receives a large bending force in a perpendicular direction thereto (in an arrow X direction in FIG. 1) so that the bending force together with a rotating force transmitted from the motor shaft 6 causes the worm shaft 28 to bend. As the bearing holding portion 21p is formed to readily bend from a body of the gear housing 21, the first bearing 22a and the bearing holding portion 21p are inclined by following the bending of the worm shaft 28 so that a large frictional force, which is concentrated locally, is not applied to an axial end of the first bearing 22a.

Further, when a rotating force is applied to the output shaft 25 while the motor stops, the middle part of the worm shaft 28 receives a large bending force in a perpendicular direction thereto (in an arrow X direction in FIG. 1) which causes the worm shaft 28 to bend since a reverse rotation is prevented by the clutch C. As the bearing holding portion 21p is formed to readily bend from a body of the gear housing 21, the first bearing 22a and the bearing holding portion 21p are inclined by following the bending of the worm shaft 28 so that a large frictional force, which is concentrated locally, is not applied to an axial end of the first bearing 22a.

As mentioned above, in the motor according to the first embodiment, local frictional wear of the first bearing 22a is limited. Further, the gear housing 21 is prevented from deforming plastically to such an extent that a relative position between the worm shaft housing recess 21h and the wheel housing recess 21i is changed. As a result, a motor efficiency reduction and a noise generation are prevented.

Further, even if the worm shaft 28 and the bearing holding portion 21p are bent and inclined within the given range mentioned above due to the overload applied to the output shaft 25, the motor shaft 6 is not be bent and inclined.

(Second Embodiment)

A motor according to a second embodiment is described with reference to FIGS. 8 to 13B. The motor is composed of a motor body 51, a speed reduction device 52 and a clutch 53. The motor body 51 has a cylindrical yoke 54 having a bottom, bearings 55a and 55b that are fixed to the yoke 54, a motor shaft 56 rotatably held by the bearings 55a and 55b, and an armature fixed to the motor shaft 56. The motor shaft 56 is provided at an end thereof (an end on an opening end side of the yoke 4 and shown on a right side in FIG. 8) with a coupling portion 56a whose cross section is formed in a letter D shape.

The speed reduction device 52 is composed of a resin gear housing 21 whose end (left side end in FIG. 8) is fastened by screws to the yoke 54, first and second bearings 59 and 60, a worm shaft 61, a warm wheel 62 and an output shaft 63.

Figure 8:
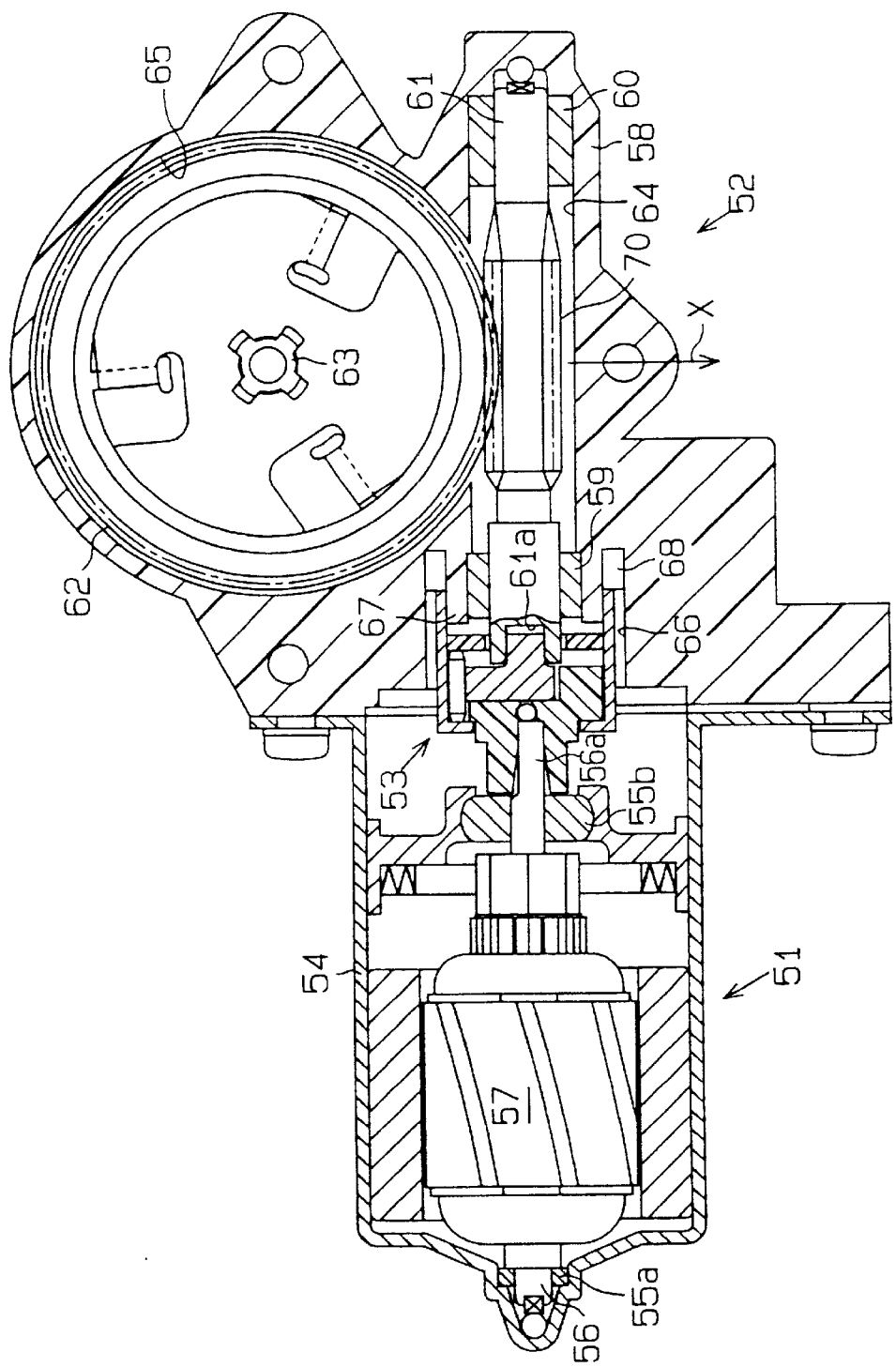
FIG. 8 is a cross sectional view showing a motor according to a second embodiment of the present invention.
Figure 9:
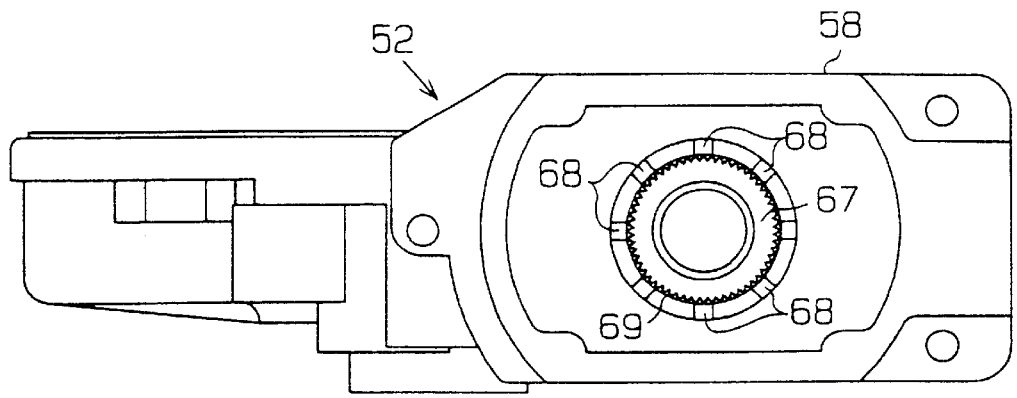
FIG. 9 is a plan view of a gear housing according to the second embodiment.

The gear housing 58 is provided with a worm shaft housing recess 64 extending in an axial direction of the motor shaft 56 from an end thereof (left side end in FIG. 8), and a wheel housing recess 65 that communicates with a middle portion of the worm shaft housing recess 64 in a perpendicular direction to an axis thereof (on an upper side in FIG. 8).

Figure 10:
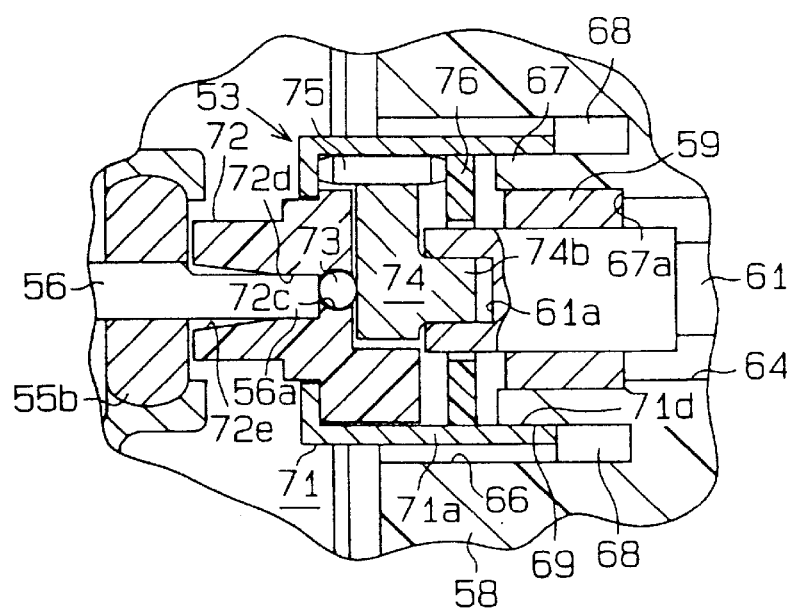
FIG. 10 is a partly enlarged cross sectional view of the motor of FIG. 8.

As shown in. FIG. 10, the gear housing 58 is further provided at an end (opening end) of the worm shaft housing recess 64 with a recess 66 whose inner diameter is larger than that of the worm shaft housing recess 64.

A bearing holding portion 67, which may be bent perpendicularly to an axis thereof, is formed to protrude out of the gear housing 58 into the recess 66 on a bottom side. The bearing holding portion 67, whose inner diameter is larger than that of the worm shaft housing recess 64 and whose outer diameter is smaller that an inner diameter of the recess 66, is formed in a cylindrical shape to extend axially until about a middle portion of the recess 66. An inside bottom surface 67a bridging an inner surface of the bearing holding portion 67 and an inner surface of the worm shaft housing recess 64 is located at a position more protruding in the recess 66 than that an outer bottom surface bridging an outer surface of the bearing holding portion 67 and an inner surface of the recess 66. The bearing holding portion 67 is provided on an outer circumferential surface on a base side thereof (right side in FIGS. 8 and 10) with 8 pieces of ribs 68, which are arranged with at 45° constant angular intervals and connected with the inner surface of the recess 66. Each size of the ribs 68 is so decided that a bending amount of the bearing holding portion 67 in a perpendicular direction to an axis thereof shows a predetermined value relative to a given value of bending load applied thereto.

The bearing holding portion 67 is provided on an outer surface on a front-end side thereof with a serration 69 having a plurality of nearly triangle teeth.

The first bearing 59, which is a cylindrical sliding bearing, is fitted into the bearing holding portion 67 so that an end thereof (right side end in FIGS. 8 and 10) is in contact with the inner bottom surface 67a. An inner diameter of the first bearing 59 is smaller than that of the worm shaft housing recess 64. The second bearing 60 is fitted into a bottom sidewall of the worm shaft housing recess 64.

The worm shaft 61 is provided on a middle part thereof with a worm 70 and is housed in the worm housing recess 64. Opposite ends of the worm shaft 61 are rotatably held by the first and second bearings 59 and 60. The worm shaft 61 is provide at an end thereof (left side in FIG. 8) with an engaging recess whose cross section is formed nearly in a square shape.

The worm wheel 62 is in mesh with the worm 70 and housed in the wheel housing recess 65 so as to rotate in an axial center thereof perpendicular to the worm shaft 61 (in a perpendicular direction to the drawing of FIG. 8). The output shaft 63 is connected to the worm wheel 62 so as to rotate coaxially with the worm wheel 62.

The motor shaft 56 is coupled via the clutch 53 with the worm shaft 61. The clutch 53, as shown in FIG. 11, has a clutch housing 71, a drive rotor 72, a ball 73, driven rotor 74, a plurality of (3) rollers 72, and a ring 76.

The drive rotor 72, which is made of resin, has a shaft portion 72a and a disk portion 72b whose diameter is larger than that of the shaft portion 72a. The drive rotor 72 is provided at a center thereof with a spherical shaft hole 72c and a coupling bore 72d whose cross section is formed in a letter D shape and which is adjacent to a base end (lower side in FIG. 11) of the spherical shaft hole 72c. The coupling portion 56a of the motor shaft 56 is coupled with the coupling bore 72d, as shown in FIG. 11, without a relative rotation to the coupling bore 72d. The disk portion 72b is further provided adjacent to the coupling bore 72d with a tapered portion 72e whose diameter is larger toward an opening from which the motor shaft 56 (coupling portion 56a) is inserted into the coupling bore.

The disk portion 72b is provided on a front side thereof (upper side in FIG. 11) with a plurality (3 pieces) of projections 81, which extend along an outer circumferential surface thereof and in an axial direction thereof at constant angular intervals so that openings 83 are formed between the projections adjacent to each other. As shown in FIG. 12, each of the projections 81 is provided on an inner wall surface thereof (radially inner surface) with a protruding piece 81a protruding toward a center thereof so that a plurality of (3) fan shaped engaging grooves 82, which are positioned between the protruding pieces 81a adjacent to each other and communicate with each other on center axial sides thereof, are formed at constant angular intervals.

Figure 11:
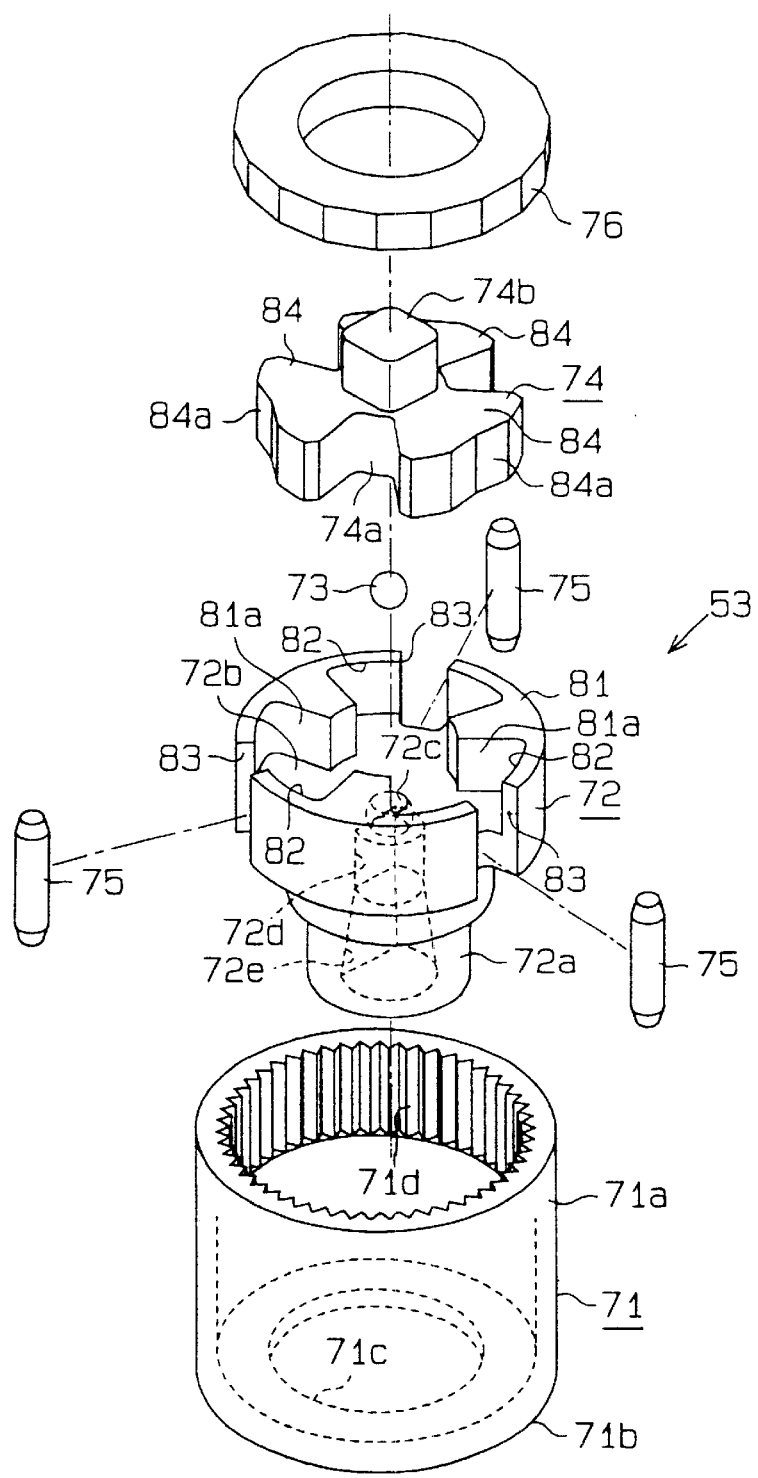
FIG. 11 is exploded perspective views of a clutch according to the second embodiment.

As shown FIG. 11, the ball 73, which is made of metal, is housed rotatably in the spherical shaft hole 72c not to drop out therefrom.

The driven rotor 74 has a disk portion 74a and a fitting portion 74b whose cross section is formed in a square shape and which protrudes from a center thereof toward a front end thereof (upper side in FIG. 11). The fitting portion 74b, as shown in FIG. 10, is fixed to the engaging recess 61a of the worm shaft 61 without a relative rotation thereto.

As shown in FIG. 12, the disk portion 74a is provided with a plurality of (3 pieces) of fan shaped engagement projections 84 extending radially and outwardly at constant angular intervals. The engagement projections 84 are rotatably housed in the engaging grooves 82. The driven rotor 74 is in a point contact with the ball 73 housed in the spherical shaft hole 72c and a rotation thereof is smooth.

Each of the engagement projections is provided with a control surface 84a which is formed by cutting off straight an outer circumferential surface from opposite ends toward a center thereof so that a diameter of the center is shorter than the end thereof.

The drive rotor 72 housing the driven rotor 74 is housed rotatably in a clutch housing 71 with a slight clearance between an inner surface of the clutch housing 71 and an outer surface thereof.

As shown in FIG. 11, the clutch housing 71 has a nearly cylindrical outer ring 71a and a bottom portion 71b having a center hole 71c at an axial center thereof. The shaft portion 72a of the drive rotor 72 is inserted rotatably into the center hole 71c. The outer ring 71a is provided at inner circumferential surface on an opening side thereof with a serration 71d having a plurality of nearly triangle teeth groove. As shown in FIG. 10, the serration 69 of the bearing holding portion 67 is fitted into the serration 71d until an end of the outer ring 71a on an opening side thereof comes in contact with the ribs 68.

As shown in FIG. 12, rollers 75 are arranged in a space formed by an inner circumferential surface of the outer ring 71a, respective first and second surfaces 83a and 83b of the openings 83 and the control surfaces 84a of the engagement projections 84.

Each of the rollers 75, which is a column, is arranged in such a manner that a center axis thereof is in parallel to that of the clutch 53. Each diameter of the rollers 75 is smaller than a distance between a center of the control surface 84a and the inner circumferential surface of the outer ring 71a and is larger than a distance between an end of the control surface 84a and the inner circumferential surface of the outer ring 71a. The ring 76 is arranged on a front end (upper side in FIG. 11) of the driven rotor 74. The ring 76, which is made of resin, is press fitted into the outer ring 71a of the clutch housing 71 so that axial movements of rollers 75 are restricted.

As shown in FIG. 13A, when the drive rotor 72 rotates in a direction shown by an arrow (clockwise), a side surface 84b (counterclockwise side) of the engagement projection 84 comes in contact with and is pressed by a side surface 81b (clockwise side) of the protruding piece 81a. To the contrary, when the drive rotor 72 rotates counterclockwise, another side surface 84c (clockwise side) of the engagement projection 84 comes in contact with and is pressed by another side surface 81c (counterclockwise side) of the protruding piece 81a. In cases mentioned above, as each of the rollers 75 is pushed by the opening 83 to locate at a position corresponding to a center of the control surface 84a, a rotation of the driven rotor 74 is not interrupted and the driven rotor 74 rotates together with the driven rotor 72.

On the other hand, as shown in FIG. 13B, when the driven rotor 74 rotates in a direction shown by an arrow (counterclockwise), each of the rollers 75 makes a relative movement toward an end of the control surface 84a and held (rocked) between the control surface 84a and the inner circumferential surface of the outer ring 71a. To the contrary, when the driven rotor 74 rotates, each of the rollers 75 makes a relative movement toward another end of the control surface 84a and held (rocked) between the control surface 84a and the inner circumferential surface of the outer ring 71a. Since the outer ring 71a is fixed to the speed reduction device (bearing holding portion 67) further rotation of the driven rotor 74 is prevented without a follow rotation of the drive rotor 72.

As the clutch 53 has a slight clearance between the outer circumferential surface of the drive rotor and the inner circumferential surface of the clutch housing 71, a radial relative movement of the drive rotor 72 to the clutch housing 71 within a given range (by a length of the clearance) is allowed. Further, since the coupling bore 72d has the tapered portion 72e, an inclination of the motor shaft 56 to a center axis of the coupling bore 72d at a given angular range (by an inclination angle of the tapered portion 72e) is allowed. That is, the clutch 53 serves to allow a given amount of alignment gap (radial displacement and inclination) between the motor shaft 56 and the worm shaft 61.

With the motor mentioned above, when the motor body 51 is driven to rotate the motor shaft 56, a driving force is transmitted via the clutch 53 to the worm shaft 61 so that the worm shaft 61 rotates. Then, the worm wheel 62 rotates at a lower rotating speed and a higher torque than the worm wheel 61. Accordingly, the output shaft 63 rotates to transmit the rotating force to an outside load according to the rotation of the worm wheel 62.

When an overload is applied to the output shaft 63 during a driving operation of the motor, a middle part of the worm shaft 61 receives a large bending force in a perpendicular direction thereto (in an arrow X direction in FIG. 8) so that the bending force together with a rotating force transmitted from the motor shaft 56 causes the worm shaft 61 to bend. As the bearing holding portion 67 is formed to readily bend from a body of the gear housing 58, the first bearing 59 and the bearing holding portion 67 are inclined by following the bending of the worm shaft 61 so that a large frictional force, which is concentrated locally, is not applied to an axial end of the first bearing 59.

Further, when a rotating force is applied to the output shaft 63 while the motor stops, the middle part of the worm shaft 61 receives a large bending force in a perpendicular direction thereto (in an arrow X direction in FIG. 8) which causes the worm shaft 61 to bend since a reverse rotation is prevented by the clutch 53. As the bearing holding portion 67 is formed to readily bend from a body of the gear housing 58, the first bearing 59 and the bearing holding portion 67 are inclined by following the bending of the worm shaft 61 so that a large frictional force, which is concentrated locally, is not applied to an axial end of the first bearing 59.

As mentioned above, in the motor according to the second embodiment, local frictional wear of the first bearing 59 is limited. Further, the gear housing 58 is prevented from deforming plastically to such an extent that a relative position between the worm shaft housing recess 64 and the wheel housing recess 65 is changed. As a result, a motor efficiency reduction and a noise generation are prevented.

Further, even if the worm shaft 61 and the bearing holding portion 67 are bent and inclined within the given range mentioned above due to the overload applied to the output shaft 63, the motor shaft 56 is not be bent and inclined due to the tapered surface 72e.

Furthermore, as the inner surface of the bearing holding portion 67 holds the first bearing 59 and the outer surface of the bearing holding portion 67 is in an serration engagement with the clutch housing 71, the construction of the gear housing 58 is not complicated and an axial length of the motor becomes shorter.

Since the clutch housing 71 is inserted into the bearing holding portion 67 until the end thereof comes in contact with the ribs 68, axial positioning of the clutch 53 is easy.

Moreover, instead of engaging the serration 71d of the clutch housing 71 with the serration 69 formed at the outer circumferential surface of the bearing holding portion 67, the clutch housing 71 may be held by a holding portion provided separately from the bearing holding portion 67 in the gear housing or the outer ring 71a of the clutch housing 71 may be fitted into the recess 66 of the gear housing.

Further, instead of forming the bearing holding portion 21p or 67 according to the first or second embodiment in the cylindrical shape, the bearing holding portion 21p or 67 may be composed of a first and second holding pieces each of which has a shape formed by cutting a cylindrical body at 90° and which are arranged to face each other.

(Third Embodiment)

Figure 14:
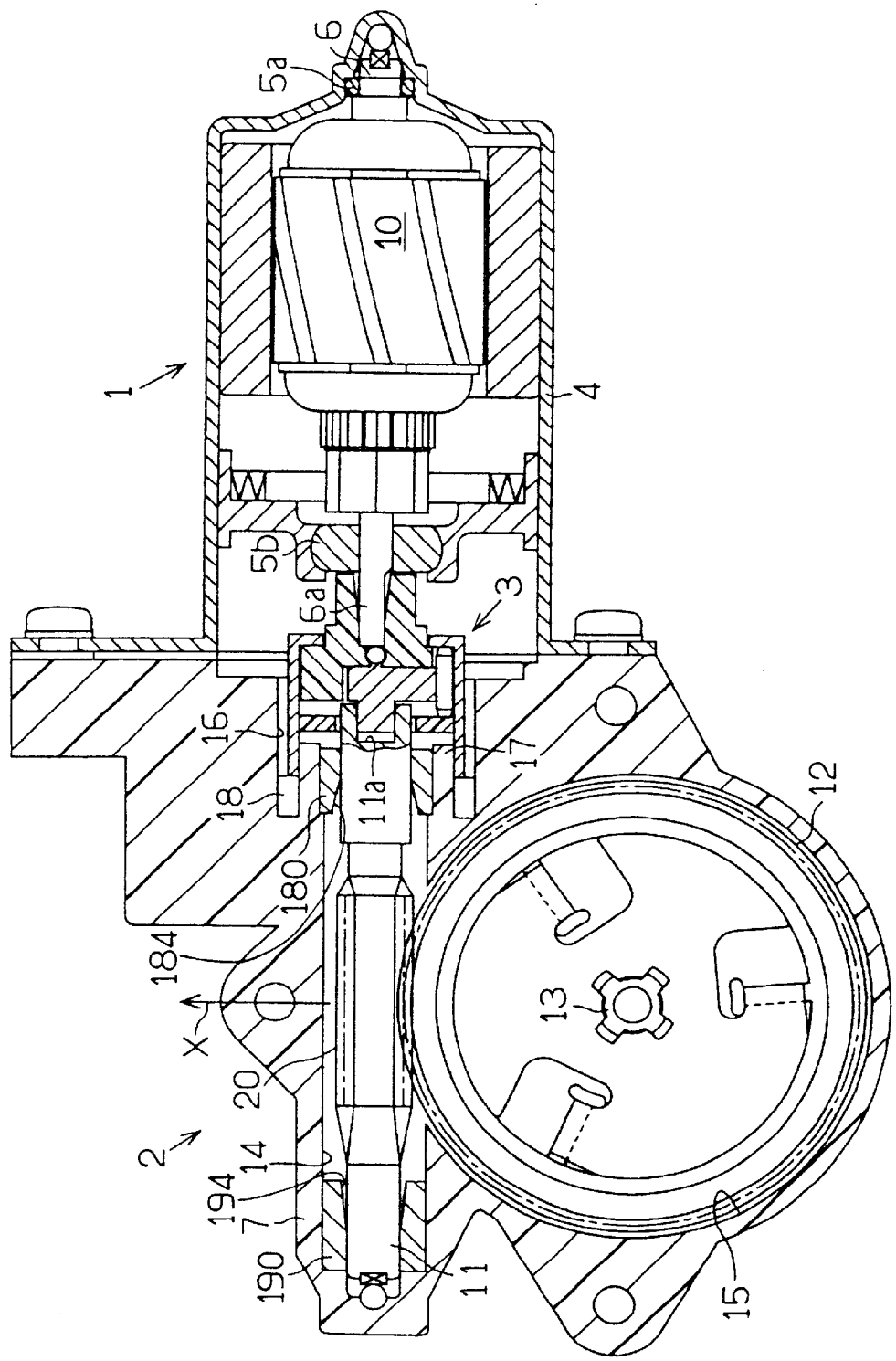
FIG. 14 is a cross sectional view showing a motor according to a third embodiment of the present invention.
Figure 15:
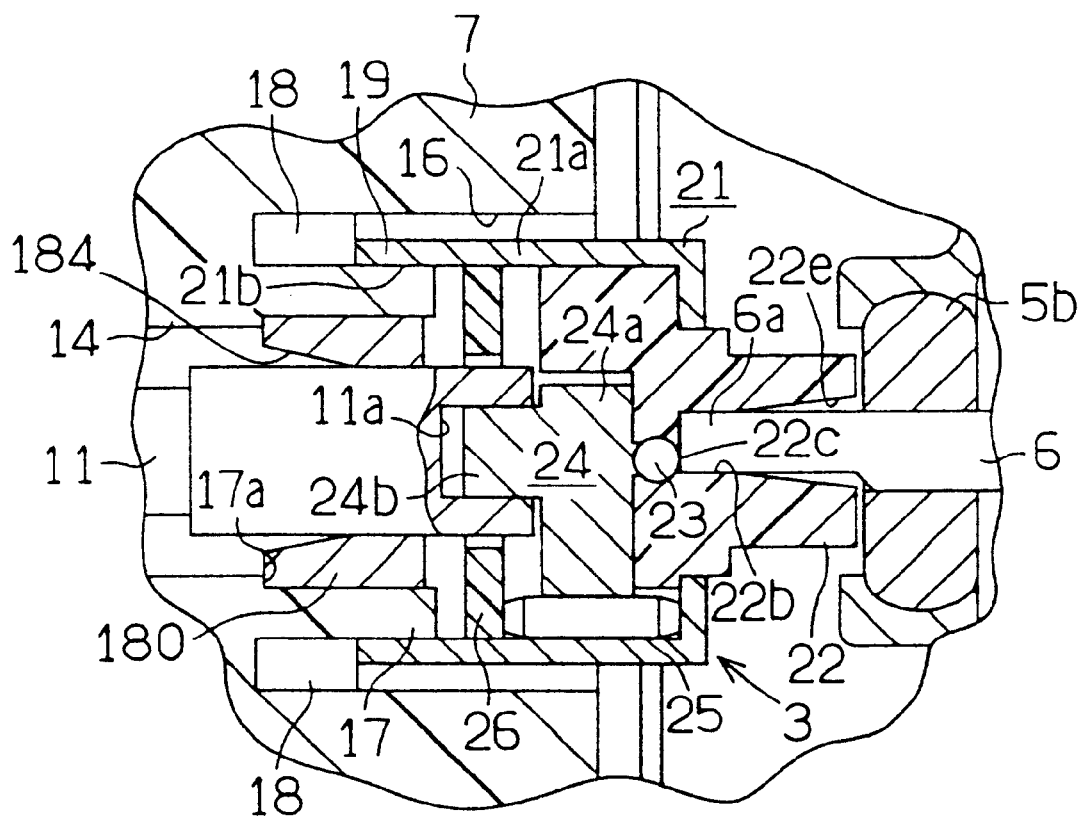
FIG. 15 is a partly enlarged cross sectional view of the motor of FIG. 14.

A motor according to a third embodiment is described with reference to FIGS. 14 to 20. The motor according to the third embodiment is similar to the motor according to the second embodiment. A difference is that, instead of the first and second bearings 59 and 60 each having a through-hole whose diameter is axially constant, each of first and second bearings 180 and 190 of the third embodiment has a through-hole provided with a cylindrical portion and a tapered portion adjacent to the cylindrical portion, as shown in FIGS. 14 and 15.

Figure 16:
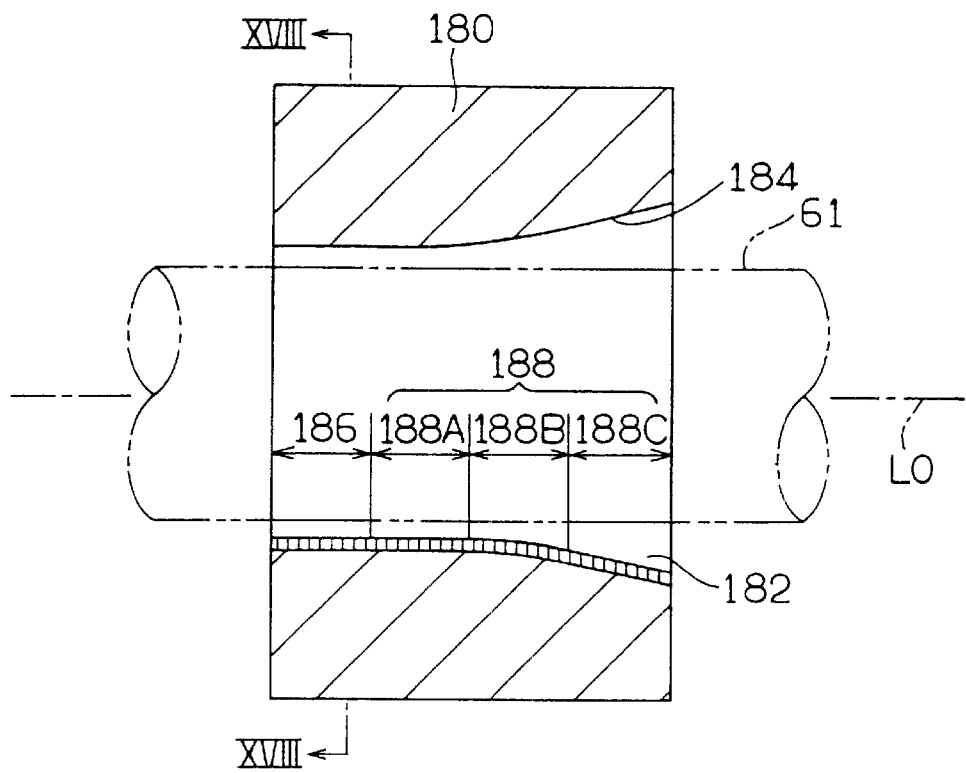
FIG. 16 is a cross sectional view of a first bearing according to the third embodiment.
Figure 17:
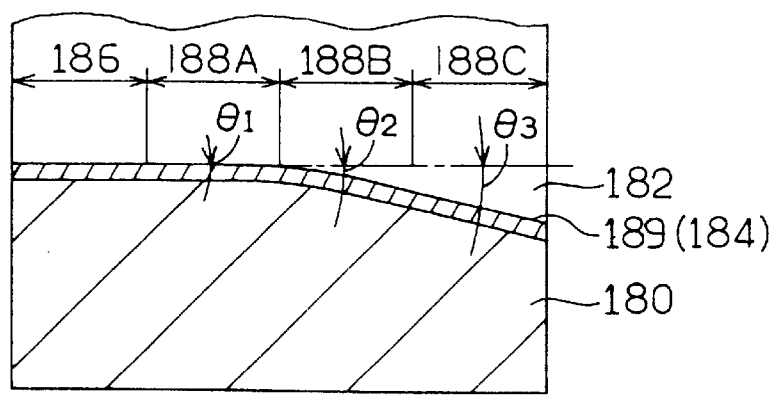
FIG. 17 is a partially enlarged cross sectional view of the first bearing of FIG. 16.
Figure 18:
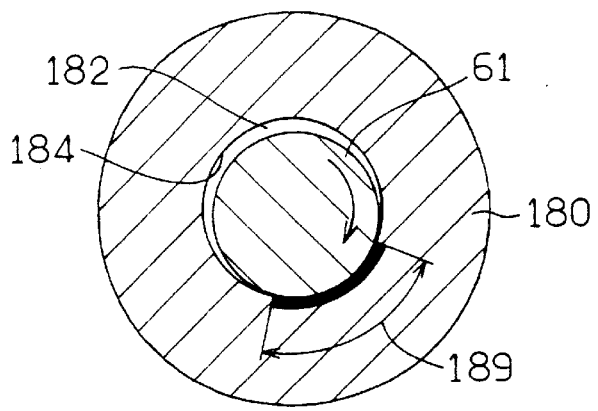
FIG. 18 is a cross sectional view taken along a line XVIII—XVIII of FIG. 16.

The first bearing 180 is a cylindrical oil retaining bearing made of porous sintered metal having bores in which lubricant oil is contained. As shown in FIGS. 16 to 18, the first bearing 180 has an axially extending through-hole 182. An inner circumferential surface 184 of the through-hole 182 is composed of a cylindrical portion 186, whose diameter is axially constant, on an opposite side of the worm 70 and a tapered portion 188, whose diameter is larger toward an opening end on a side of the worm 70, adjacent to the cylindrical portion 186.

The tapered portion 188 is constituted by first to third taper portions 188A, 188B and 188C, as shown in FIG. 16. Further, as shown in FIG. 17, taper angles θ1, θ2 and θ3 of the first to third taper portions 188A, 188B and 188C are larger toward the opening end. That is, a relation of θ1<θ2<θ3 is satisfied.

To connect smoothly the respective taper angles θ1, θ2 and θ3 form the cylindrical portion 186 toward the first to third taper portions 188A, 188B and 188C, respective boundary portions thereof are provided with round surfaces. Further, as shown in FIG. 18, the inner circumferential surface 184 of the through-hole 182 is provided with a finely finished surface 189 formed by partly filling up the bores.

Figure 19:
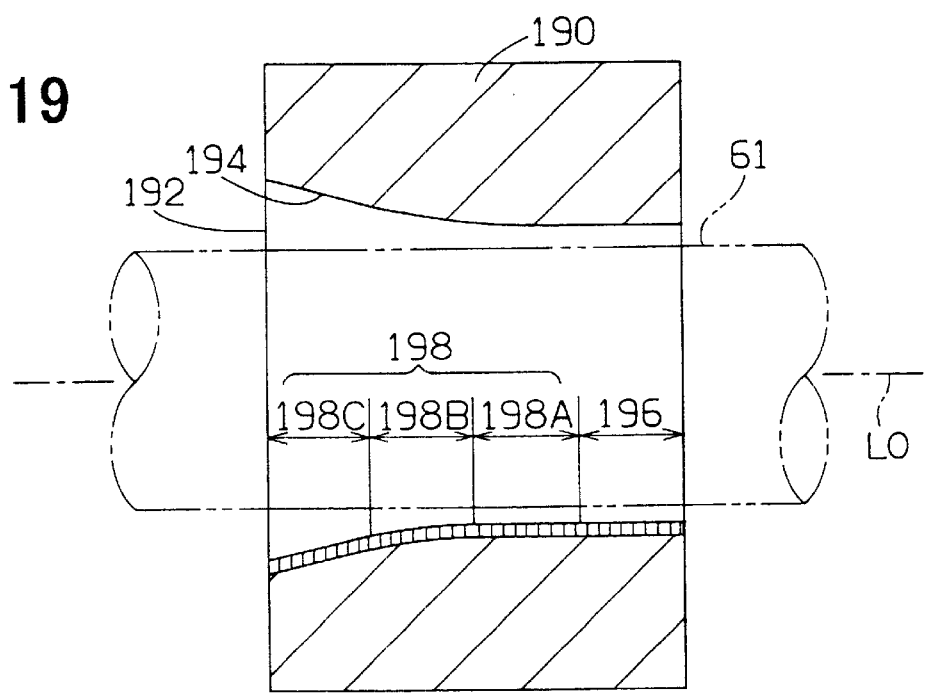
FIG. 19 is a cross sectional view of a second bearing according to the third embodiment.
Figure 20:
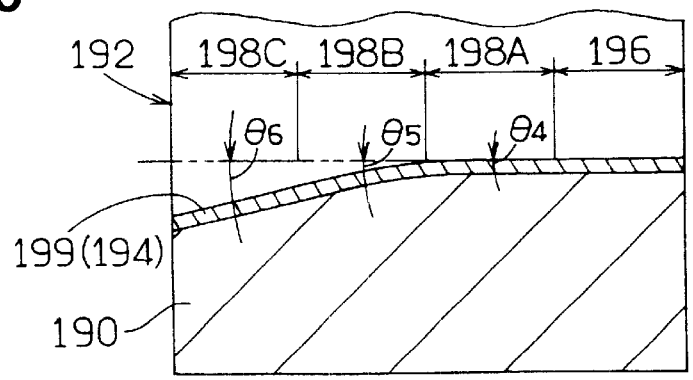
FIG. 20 is a partially enlarged cross sectional view of the second bearing of FIG. 19.

The second bearing 190, similar to the first bearing 180, is a cylindrical oil retaining bearing made of porous sintered metal having bores in which lubricant oil is contained. As shown in FIGS. 19 and 20, the second bearing 190 has an axially extending through-hole 192. An inner circumferential surface 194 of the through-hole 192 is composed of a cylindrical portion 196, whose diameter is axially constant, on an opposite side of the worm 70 and a tapered portion 198, whose diameter is larger toward an opening end on a side of the worm 70, adjacent to the cylindrical portion 196. The tapered portion 198 is constituted by fourth to sixth taper portions 198A, 198B and 198C, as shown in FIG. 19. Further, as shown in FIG. 20, taper angles θ4, θ5 and θ6 of the fourth to sixth taper portions 198A, 198B and 198C are larger toward the opening end. That is, a relation of θ4<θ5<θ6 is satisfied.

Further, the inner circumferential surface 194 of the through-hole 192 is provided with a finely finished surface 199, similar to the finished surface 189, formed by partly filling up the bores.

In the motor having the first and second bearings 10 and 190, when an overload is applied to the output shaft 63 during a driving operation of the motor, a middle part of the worm shaft 61 receives a large bending force in a perpendicular direction thereto (in an arrow X direction in FIG. 14) so that the bending force together with a rotating force transmitted from the motor shaft 56 causes the worm shaft 61 to bend.

As the first and second bearing 180 and 190, which rotatably hold the worm shaft 61, have the cylindrical portions 186 and 196 and the tapered portions 188 and 198 whose taper angles are larger gradually toward the worm 70, axial inner surfaces of the first and second bearing 180 and 190 actually in contact with the worm shaft 61 extends up to the tapered portions 188 and 198 to follow approximately a bending shape of the worm shaft 61so that axially wide-spreading face contacts with the worm shaft 61 are maintained.

At this time, the worm shaft 61 is mainly in slidable contact with the finely finished surfaces 189 and 199 of the first and second bearings 180 and 190, against which the worm shaft 61 is pushed due to the bending thereof. Accordingly, local frictional wear of the bearings 180 and 190 are limited, and a motor efficiency reduction and a noise generation are also prevented.

Further, the bearing holding portion 67 may be designed to incline a certain angle together with first bearing 180, as mentioned in the second embodiment, or not to incline by adjusting the size or the strength of the ribs 68. If the bearing holding portion 67 inclines the certain angle, an axial length of the tapered portion 188 of the first bearing 180 in actual contact with the worm shaft 61 becomes shorter.

What is claimed is:

1. A motor having a speed reduction device comprising;
   a motor body having a motor shaft for generating a driving force;
   a speed reduction device having a gear housing, a worm shaft housed in the gear housing, the worm shaft being provided with a worm, a worm wheel housed in the gear housing and in mesh with the worm, and first and second bearings provided in the housing, axial inner surfaces of the first and second bearings being in contact with and holding rotatably the worm shaft on opposite sides of the worm; and a coupling device coupling an end of the motor shaft with an end of the worm shaft on a side of the first bearing for transmitting the driving force from the motor shaft via the worm shaft to the worm wheel, wherein, when the worm shaft is bent by an overload transmitted thereto via the worm wheel, the axial inner surface of the first bearing maintains an axially widespreading face contact with the worm shaft in at least one of a manner that, to follow the bending of the worm shaft, the first bearing inclines a given angle to a bending side of the worm shaft and a manner that the axial inner surface of the first bearing is formed in a shape of approximately following a bending shape of the worm shaft and actually comes in contact with the worm shaft at positions more extending axially toward the worm.

2. A motor according to claim 1, wherein the gear housing has a bearing holding portion protruding outwardly therefrom to an extent that the bearing holding portion readily inclines along with the first bearing fixed thereto in order to follow the bending of the worm shaft.

3. A motor according to claim 2, wherein the coupling portion has a coupling bore and a tapered bore axially adjacent to the coupling bore, a diameter of the tapered bore being larger toward an opposite end to the coupling bore from which the motor shaft is inserted into the coupling bore, and, further, wherein, when the coupling portion inclines a given angle from an axis of the motor shaft along with the bearing holding portion and the first bearing, the motor shaft comes in contact with an inner surface of the tapered bore.

4. A motor according to claim 2, wherein the coupling portion comprises;

a drive rotor into which the end of the motor shaft is fitted, a driven rotor which is connected to the end of the worm shaft and is coupled with the drive rotor, and a coupling housing in which the drive and driven rotors are housed and which is fixed to the gear housing and, further, wherein the bearing holding portion is elastically deformable so as to incline more than the coupling housing to follow the bending of the worm shaft.

5. A motor according to claim 2, wherein the coupling portion comprises;

a drive rotor having a coupling bore and a tapered bore axially adjacent to the coupling bore, a diameter of the tapered bore being larger toward an opposite end to the coupling bore from which the motor shaft is inserted into the coupling bore, a driven rotor which is connected to the end of the worm shaft and is coupled with the drive rotor, and a coupling housing in which the drive and driven rotors are housed and which is fixed to the gear housing so that the inclination of the bearing holding portion for following the bending of the worm shaft causes the coupling housing and the drive and driven rotors to incline and the motor shaft comes in contact with an inner surface of the tapered bore.

6. A motor according to claim 5, wherein the bearing holding portion is formed in a cylinder shape, the first bearing being fitted into an inner circumferential surface of the bearing holding portion and the coupling housing being fitted into an outer circumferential surface of the bearing holding portion.

7. A motor according to claim 6, wherein the bearing holding portion is provided at the outer circumferential surface thereof on a side of the gear housing with a plurality of ribs at constant angular intervals and an axial end of the coupling housing is in contact with the ribs.

8. A motor according to claim 1, wherein the first bearing is provided with a first cylindrical inner circumferential portion whose inner diameter is axially constant and a first tapered inner circumferential portion axially adjacent to the first cylindrical inner circumferential portion on a side of the worm, an inner diameter of the first tapered inner circumferential portion is larger toward an opposite side to the first cylindrical inner circumferential portion, and, further, wherein the axial inner surface of the first bearing actually in contact with the worm shaft is normally the first cylindrical inner circumferential portion and, when the worm shaft is bent, extends up to at least a part of the first tapered inner circumferential portion.

9. A motor according to claim 8, where in the second bearing is provided with a second cylindrical inner circumferential portion whose inner diameter is axially constant and a second tapered inner circumferential portion axially adjacent to the second cylindrical inner circumferential portion on a side of the worm, an inner diameter of the second tapered inner circumferential portion is larger toward an opposite side to the second cylindrical inner circumferential portion, and, further, wherein the axial inner surface of the second bearing actually in contact with worm shaft is normally the second cylindrical inner circumferential portion and, when the worm shaft is bent, extends up to at least a part of the second tapered inner circumferential portion to maintain an axially widespreading face contact with the worm shaft.

10. A motor according to claim 1, wherein the coupling device has a clutch mechanism in which a rotating force of the motor shaft is transmitted to the worm shaft and a rotation of the worm wheel is not transmitted in reverse to the motor shaft.

11. A motor according to claim 8, wherein an inclination angle of the first tapered inner circumferential portion is continuously or stepwise changed toward the opposite side to the first cylindrical inner circumferential portion.

12. A motor according to claim 9, wherein inclination angles of the first and second tapered inner circumferential portions are continuously or stepwise changed toward the opposite sides to the first and second cylindrical inner circumferential portions, respectively.

13. A motor according to claim 1, wherein the motor shaft and the worm shaft are coupled with each other in the coupling device to have a radial slight clearance within which the worm shaft is allowed to incline a given angle to an axial direction of the motor shaft.

* * * * *